/ Patented Mar. 13, 1951

2,544,746

UNITED STATES PATENT OFFICE 2,544,746

VULCANIZATION OF CHLOROPRENE POLYMERS

Arthur A. Baum, Wilmington, Del., assignor to E. I. du Pont de Nemours and Company, Wilmington, Del., a corporation of Delaware No Drawing. Application July 27, 1949, Serial No. 107,145

7 Claims. (Cl. 260—79.5)

This invention relates to an improvement in the process of vulcanizing polychloroprene, commercially known as neoprene.

Neoprene is a generic name which is applied to polymers of 2-chloro-1,3-butadiene (chloroprene), and co-polymers of chloroprene with dienes or vinyl compounds in which chloroprene comprises the predominant monomer. These polymers or co-polymers are usually made in aqueous emulsions and are available on the market today under names such as GR—M, Neoprene Type GN, Neoprene Type E, Neoprene FR, Neoprene Type ILS, Neoprene Type KNR, and as latices under type numbers such as Type 571, Type 842, Type 842A, and others, all of which will be referred to hereafter as polychloroprene or chloroprene polymers.

Polychloroprenes differ greatly from other synthetic rubbers and from natural rubber in the manner in which they can be vulcanized. In general, excellent vulcanizates may be obtained from polychloroprenes by incorporating certain metal oxides such as magnesia and zinc oxide into the plastic polychloroprene and heating to effect vulcanization. For certain applications litharge is recommended for use in place of the magnesia and zinc oxides, while for some types (such as the chloroprene-isoprene co-polymer and some latex formulations) sulfur is recommended but is not necessary to effect vulcanization.

If a more rapid rate of cure is desired than is afforded by metal oxides alone, it has been customary to use in conjunction with these metal oxides certain organic compounds as accelerators. Among these might be mentioned catechol, "Permalux" (the di-ortho-tolyl guanidine salt of dicatechol borate), hexamethylenetetramine, the condensation product of butyraldehyde and aniline, and others. By the addition of these agents a higher state of cure, as evidenced by higher modulus, etc., can be reached in the same pression set, etc., can be reached in the same time of vulcanization as an unaccelerated stock or the same state of cure can be reached in a much shorter time of heating.

These accelerators suffer from many disadvantages which greatly limit their use. Thus, some are "scorchy," that is, they are so active at relatively low temperatures that the polychloroprene is liable to become unmanageable during processing. Other cannot be used in latex application, or are inapplicable to cements.

It is an object of this invention to provide a process for vulcanizing polychloroprene in which an active accelerator is employed which gives faster cures at vulcanizing temperatures without exhibiting undesirable scorchy properties at ordinary temperatures and which therefore has high safety properties. It is a further object of the invention to provide an active accelerator for the vulcanization of polychloroprene which is light-colored and non-discoloring when used in light-colored stocks. A still further object of the invention is to provide an accelerator for the vulcanization of polychloroprene which imparts to the vulcanizates improved physical properties.

I have found a new class of organic compounds which are active accelerators for polychloroprene at ordinary vulcanizing temperatures but which do not cause premature vulcanization of the stocks when incorporated therein, which are light-colored and non-discoloring when used in light-colored stocks and which give improved physical properties to the resulting polychloroprene vulcanizates.

These accelerators are cyclic thioureas of the formula:

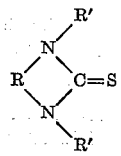

where R is an aliphatic (including cycloaliphatic) hydrocarbon radical containing from 2 to 24 carbon atoms and in which the thiourea ring contains from 3 to 5 carbon atoms, and the R' are hydrogen or methyl. The divalent hydrocarbon radical may be attached to the nitrogen groups through adjacent or non-adjacent carbon atoms, or where short chain aliphatic compounds are employed it may be attached through the ends of the chain. Alicyclic compounds, either monocyclic or bicyclic, may be employed, as more particularly illustrated in the following examples. These cyclic thioureas are powerful accelerators for the vulcanization of polychloroprene and have been found to be applicable to all types of chloroprene polymers, including the various latices and cements.

It will be observed that the cyclic thiourea compounds employed in this invention may exist in tautomeric forms, such as illustrated below for two of the compounds coming within the class.

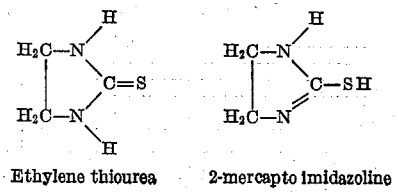

Ethylene thiourea    2-mercapto imidazoline

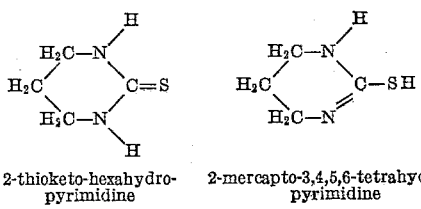

2-thioketo-hexahydro-pyrimidine     2-mercapto-3,4,5,6-tetrahydro-pyrimidine

In the manufacture of chloroprene polymers, the degree of polymerization may be controlled by the addition of certain regulators or modifiers. Various modifiers which have been used for this purpose are sulfur, sulfur dioxide, hydrogen sulfide, mercaptans, iodine compounds such as iodoform and allyl iodide, aromatic azo compounds and dialkyl xanthic disulfides. If mercaptans or iodoform are used as the modifiers of chloroprene polymerization, the resulting polychloroprene vulcanizes slowly in the formulations containing only metal oxides as vulcanizing agents. These types of polychloroprene have been found to respond remarkably well to acceleration with cyclic thioureas.

The following examples are given to illustrate the invention. The parts used are by weight, unless otherwise specified.

EXAMPLE 1

Polychloroprene compounds are mixed according to the following formula:

| | Parts |
|---|---|
| Polychloroprene [1] | 100.0 |
| Stearic acid | 0.5 |
| Extra light calcined magnesia | 4.0 |
| Semi-reinforcing furnace carbon black | 29.0 |
| Zinc oxide | 5.0 |
| Accelerator | As shown |

[1] Polychloroprene prepared by the emulsion polymerization of chloroprene in the presence of sulfur as a modifier, as described in U. S. Patent 2,234,215.

Slabs and pellets of the polymer are cured and tested by standard A. S. T. M. methods. The results of these tests are summarized in Table I.

Table I

| | Min. Cure | At °F. | Permalux[1] 1.0 | Ethylene thiourea 1.0 |
|---|---|---|---|---|
| Stress in p. s. i. at 300% elongation. | 60 | 227 | | 1,010 | 270 |
| | 10 | 307 | 920 | 1,360 | 1,240 |
| | 20 | 307 | 1,040 | 1,550 | 1,600 |
| | 40 | 307 | 1,150 | 1,575 | 1,625 |
| Stress in p. s. i. at 500% elongation. | 60 | 227 | | 2,000 | 690 |
| | 10 | 307 | 1,975 | 2,575 | 2,525 |
| | 20 | 307 | 2,075 | 2,850 | 3,000 |
| | 40 | 307 | 2,350 | | |
| Tensile strength in p. s. i. | 60 | 227 | 260 | 2,900 | 1,750 |
| | 10 | 307 | 3,050 | 3,000 | 3,150 |
| | 20 | 307 | 3,075 | 3,150 | 3,075 |
| | 40 | 307 | 3,275 | 2,900 | 3,050 |
| Elongation at break, per cent | 60 | 227 | 1,500+ | 800 | 1,200 |
| | 10 | 307 | 880 | 640 | 630 |
| | 20 | 307 | 820 | 560 | 520 |
| | 40 | 307 | 800 | 460 | 480 |
| Shore hardness | 60 | 227 | 35 | 56 | 46 |
| | 10 | 307 | 59 | 62 | 62 |
| | 20 | 307 | 59 | 65 | 62 |
| | 40 | 307 | 61 | 65 | 62 |
| Per cent Compression set, Method B | 25 | 307 | 38.6 | 22.3 | 20.3 |
| Yerzley resilience, per cent | 25 | 307 | 77.5 | 83.9 | 84.3 |
| Goodrich Flexometer Heat Buildup, °C., 9/16" Stroke: | | | | | |
|   5 Min | 25 | 307 | 27 | 18 | 18 |
|   10 Min | | | 53 | 31 | 29 |
|   15 Min | | | 72 | 39 | 35 |
|   20 Min | | | 84 | 44 | 38 |
| Mooney scorch, Min. for 20 point rise above minimum value | | | 41 | 15 | 22 |

[1] The di-ortho-tolyl guanidine salt of dicatechol borate.

The ethylene thiourea is not only a much safer accelerator than "Permalux," but imparts to the polychloroprene a higher state of cure as judged by modulus, compression set, and resilience.

EXAMPLE 2

Stocks were compounded in the following formula, using the same type of polychloroprene as in Example 1:

| | Parts |
|---|---|
| Polychloroprene | 100.0 |
| Stearic acid | 0.5 |
| Extra light calcined magnesia | 4.0 |
| Semi-reinforcing furnace carbon black | 28.8 |
| Phenyl-alpha-naphthylamine | 2.0 |
| Zinc oxide | 5.0 |
| Accelerator | 1.0 |

In these tests small scale ring specimens were cured and tested in water at 25° C., using the Williams tensile machine (see Williams and Sturgis, Ind. Eng. Chem. 31, 1303 (1939)). The "scorchiness" of the raw stock was determined by a mill scorch test. In this test 24 grams of compounded raw stock is milled on a 2" x 6" mill held at 135° C. with an opening of 0.016 inch. The end point of the test occurs at that time when the stock becomes lacy and refuses to band on the mill. This is known as the "scorch time." The longer the scorch time, the less scorchy is the stock. In Table II are given the moduli at 300% in p. s. i. for a 20 minute cure at 307° F., and the scorch time for two cyclic thioureas.

Table II

| Accelerator | 300% modulus, p. s. i. | Scorch Time, Minutes |
|---|---|---|
| Control, no accelerator | 1,450 | 4.3 |
| N,N'-Tetramethylene thiourea | 1,990 | 4.6 |
| 2,4-Diazabicyclo-[3.3.1]-3-nonanethione | 1,830 | 7.4 |

The compounds employed are represented by the formulae:

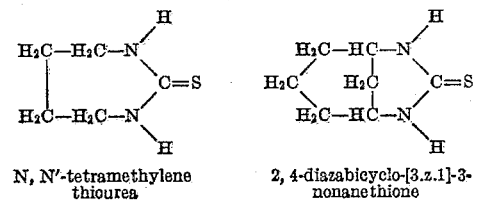

N,N'-tetramethylene thiourea     2,4-diazabicyclo-[3.z.1]-3-nonanethione

EXAMPLE 3

The use of cyclic thioureas to accelerate the vulcanization of polychloroprene films from latex is illustrated in the following tests, where a 50% solids latex made by the alkaline emulsion polymerization of chloroprene in the presence of sulfur as a modifier, as described in U. S. Patent 2,264,173, was used. The latex compositions were made up according to the following formula:

| | Parts |
|---|---|
| Polychloroprene [1] | 100.0 |
| Zinc oxide | 5.0 |
| Accelerator | 2.0 |
| Sulfur | As shown |

[1] Enough latex was used to give 100 parts of polychloroprene dry weight.

Films were prepared by the coagulant dip process, then washed in warm water, dried 24 hours at room temperature, and then one hour at 70° C. The films were then removed from the forms and cured in an air oven at 100° C., after which they were tested as usual on a Scott tensile machine. The effect of various thioureas on the rate of cure is shown in Table III.

*Table III*

| Accelerator | Parts of Sulfur | Stress in p. s. i. at 800% Elongation, Cure at 100° C. | |
|---|---|---|---|
| | | 30 Minutes | 60 Minutes |
| Unaccelerated control (average of ten controls) | 2 | 1,100 | 1,140 |
| 4-Methyl-2-mercapto-imidazoline | 2 | 1,500 | 1,850 |
| Ethylene thiourea | 1 | 1,100 | 2,150 |

The 4-methyl-2-mercapto-imidazoline, in its tautomeric forms, has the formulae:

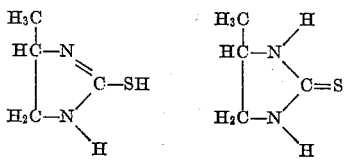

EXAMPLE 4

A sample of polychloroprene was prepared by the alkaline emulsion polymerization of chloroprene in the presence of dodecyl mercaptan as a modifier. The polychloroprene was isolated from the latex by the freeze coagulation method described by Starkweather and Youker [Ind. Eng. Chem. 31, 934 (1939)], and compounded in the following formula:

|   | Parts |
|---|---|
| Polychloroprene | 100.0 |
| Extra light calcined magnesia | 7.0 |
| Zinc oxide | 5.0 |
| Accelerator | As shown |

Standard dumbbells of these gum stocks were cured for five minutes at 307° F. with the results given in Table IV. An unaccelerated control from the polymer in this formulation is undercured even after a twenty minute cure at this temperature.

*Table IV*

| Accelerator | Parts Accel. Used | Stress in p. s. i. at elong. of— | | Tensile Strength, p. s. i. | Per Cent Elong. at Break |
|---|---|---|---|---|---|
| | | 600% | 800% | | |
| 2,4-Diazabicyclo-[3,3,1]-3-nonanethione | 1.0 | 580 | 1,260 | 2,825 | 1,060 |
| 5,5-Dimethyl-2-hexahydro-pyrimidinethione | 1.0 | 820 | 1,950 | 3,425 | 960 |
| Ethylene thiourea | 0.5 | 710 | 1,675 | 2,600 | 910 |
| 2-Hexahydropyrimidinethione | 1.0 | 930 | 2,350 | 3,125 | 860 |
| 4-Methyl-2-hexahydropyrimidinethione | 0.5 | 690 | 1,380 | 2,650 | 1,010 |
| N,N'-tetramethylene thiourea | 0.5 | 1,090 | | 1,875 | 720 |

The compounds used in the above table, for which formulae have not previously been given, are as follows:

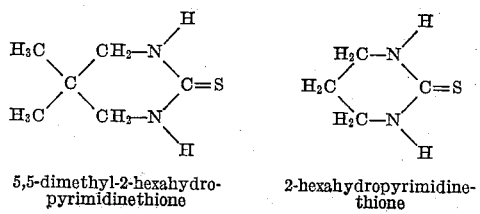

5,5-dimethyl-2-hexahydro-pyrimidinethione 2-hexahydropyrimidine-thione

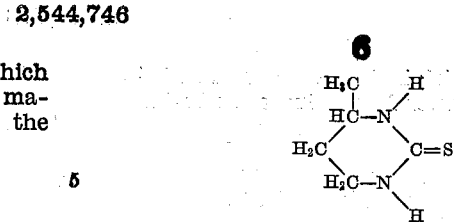

4-methyl-2-hexahydropyrimidinethione

EXAMPLE 5

Polychloroprene, prepared as described in Example 4, was compounded according to the following formula:

|   | Parts |
|---|---|
| Polychloroprene | 100.0 |
| Stearic acid | 0.5 |
| Extra light calcined magnesia | 4.0 |
| Semi-reinforcing furnace carbon black | 28.8 |
| Zinc oxide | 5.0 |
| Phenyl-alpha-naphthylamine | 2.0 |
| Accelerator | 1.0 |

Small scale rings were cured from these stocks for twenty minutes at 307° F. and tested as described in Example 2. An unaccelerated control gave a very weakly cured stock even after forty minutes at 307° F. In Table V are given the stresses in p. s. i. at 300% elongation for the various accelerators arranged in decreasing order of effectiveness.

*Table V*

| Accelerator | 300% Modulus |
|---|---|
| 1,3-Dimethyl-2-imidazolidinethione | 2,320 |
| 2-Hexahydropyrimidinethione | 2,060 |
| 5,5-Dimethyl-2-hexahydropyrimidinethione | 1,740 |
| 4,5-Diundecyl-2-imidazolethione | 1,070 |

The compounds used in the above table, for which formulae have not previously been given, are as follows:

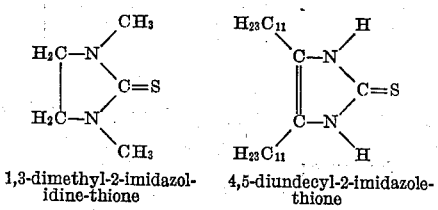

1,3-dimethyl-2-imidazol-idine-thione 4,5-diundecyl-2-imidazole-thione

EXAMPLE 6

A sample of polychloroprene was prepared as in Example 4, except that instead of using chloroprene alone as the polymerizable monomer, a mixture of 70 parts of chloroprene and 30 parts of styrene was used. The resulting chloroprene-styrene copolymer was compounded, cured and tested as in Example 5, using the same formula. The test pieces when cured for twenty minutes at 307° F. showed that with ethylene thiourea the modulus at 300% elongation was 1610, while the control stock which had no accelerator added was not cured even after forty minutes at 307° F.

EXAMPLE 7

A sample of polychloroprene was prepared as in Example 4, except that, instead of using chloroprene alone, a mixture of 80 parts of chloroprene and 20 parts of 2,3-dichloro-1,3-butadiene was used. The resulting co-polymer was compounded, cured and tested as in Example 5, using the same formula. Results of these tests are given in Table VII (cured for 20 minutes at 307° F.).

Table VII

| Accelerator | 300% Modulus |
|---|---|
| Control, no accelerator added | [1] 190 |
| 2,4-Diazabicyclo-[3.3.1]-3-nonanethione | 1,140 |
| Ethylene thiourea | 1,990 |

[1] This is a very weak, undercured vulcanizate.

EXAMPLE 8

A sample of polychloroprene was prepared by the acid aqueous emulsion polymerization of a mixture of 85 parts of chloroprene and 15 parts of acrylonitrile in the presence of a small amount of sulfur as a modifier. The co-polymer so obtained was compounded, cured and tested as in Example 5, using the same formula. In Table VIII are given the 200% and 300% moduli in p. s. i. for a five minute cure at 307° F.

Table VIII

| Accelerator | Modulus, p. s. i. | |
|---|---|---|
| | 200% | 300% |
| Control, no accelerator added | 650 | 1,120 |
| 2,4-Diazabicyclo-[3.3.1]-3-nonanethione | 810 | 1,480 |
| Ethylene thiourea | 880 | 1,590 |

EXAMPLE 9

Polychloroprene, prepared as described in Example 4, was compounded according to the following formula:

| | Parts |
|---|---|
| Polychloroprene | 100.0 |
| Stearic acid | 0.5 |
| Semi-reinforcing furnace black | 28.8 |
| Phenyl-alpha-naphthylamine | 2.0 |
| Litharge | 10.0 |
| Accelerator | 1.0 |

The stocks were cured for twenty minutes at 307° F. and tested as in Example 5, with the results shown in Table IX.

Table IX

| Accelerator | 300% Modulus |
|---|---|
| Control, no accelerator added | 720 |
| 2,4-Diazabicyclo-[3.3.1]-3-nonanethione | 1,110 |

In general, these cyclic thioureas are effective with all polymers of chloroprene and those copolymers of chloroprene with other dienes or vinyl compounds in which chloroprene is the predominant monomer. They are particularly effective with chloroprene polymers or co-polymers where the polymerization is modified by the presence of small amounts (less than 1%, based on the monomer) of dodecyl mercaptan, iodoform, or diisopropyl xanthic disulfide.

The amounts of the accelerators to be used depends on the results which are desired and the type of polychloroprene used. Excellent results are obtained with a mercaptan modified polychloroprene using as little as 0.05% of the cyclic thiourea based on the polychloroprene, while as much as 10% can be used safely if a very fast, very tight cure is desired. In general, from 0.1% to 5% of these accelerators should be used, and the preferred range is 0.5% to 2%.

These accelerators may be used with sulfur or with any of the antioxidants, metal oxides, fillers, softeners, peptizing agents, colors, and other types of compounding ingredients commonly used in fabricating polychloroprene articles. As has been shown by examples, they are applicable to dry polychloroprene, latex and cements.

These cyclic thioureas employed in this invention may be prepared by the action of carbon disulfide on a primary or secondary diamine. Ethylene thiourea is readily prepared from ethylene diamine and carbon disulfide by the following reaction (see "Organic Syntheses," vol. 26, John Wiley & Sons, Inc.).

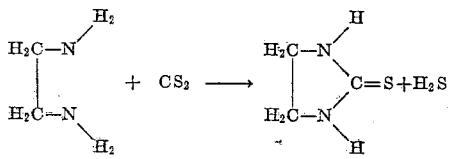

In a similar manner, 1,3-dimethyl-2-imidazolidinethione may be prepared from N,N'-dimethylethylenediamine by the reaction:

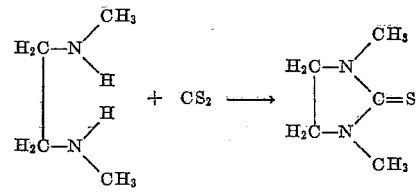

By this method 5,5-dimethyl-2-hexahydropyrimidinethione was prepared from diaminoneopentane.

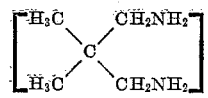

Other cyclic thioureas which are illustrative of the class that may be used as accelerators in polychloroprene are those which are derived from such diamines as:

1,2-diamino-butane
2,3-diamino-butane
1,2-diamino-2-methyl propane
2,4-diamino-pentane
1,4-diamino-2-methyl-butane
3,4-diamino-3,4-dimethyl-hexane
1-amino-3-methylamino-propane
3-amino-1-methylamino-butane
1,3-di-(methylamino)-propane The cyclic thioureas of the class particularly illustrated above are active accelerators for the vulcanization of polychloroprene. They give faster cures at vulcanizing temperatures than the usual vulcanization accelerators employed in this field, without imparting to the stock the scorchy properties characteristic of many of the presently known vulcanizing agents. They give faster cures at the ordinary vulcanizing temperatures and are particularly useful with light colored stocks since they do not cause discoloration to any material degree. These vulcanizing agents further give improved physical properties to the resulting vulcanizates, as more particularly illustrated in the comparisons given above, such as in compression set, heat build-up, etc.

I claim:

1. An unvulcanized chloroprene polymer which can be rapidly cured at ordinary vulcanizing temperatures yet does not exhibit undesirable scorchy properties at ordinary temperatures, containing from 0.05% to 10% of the weight of the polymer of a cyclic thiourea of the formula:

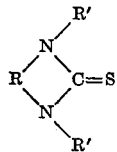

wherein R is a radical of the group consisting of aliphatic hydrocarbon and cycloaliphatic hydrocarbon radicals which contain from 2 to 24 carbon atoms and in which the thiourea ring contains from 3 to 5 carbon atoms, and the R' are substituents of the group consisting of —H and —CH$_3$.

2. An unvulcanized chloroprene polymer which can be rapidly cured at ordinary vulcanizing temperatures yet does not exhibit undesirable scorchy properties at ordinary temperatures, containing from 0.1% to 5.0% of the weight of the polymer of a cyclic thiourea of the formula:

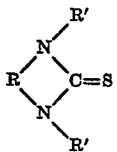

werein R is a radical of the group consisting of aliphatic hydrocarbon and cycloaliphatic hydrocarbon radicals which contain from 2 to 24 carbon atoms and in which the thiourea ring contains from 3 to 5 carbon atoms, and the R' are substituents of the group consisting of —H and —CH$_3$.

3. An unvulcanized chloroprene polymer which can be rapidly cured at ordinary vulcanizing temperatures yet does not exhibit undesirable scorchy properties at ordinary temperatures, containing from 0.1% to 5.0% of the weight of the polymer of ethylene thiourea.

4. An unvulcanized chloroprene polymer which can be rapidly cured at ordinary vulcanizing temperatures yet does not exhibit undesirable scorchy properties at ordinary temperatures, containing from 0.1% to 5.0% of the weight of the polymer of 4-methyl-2-mercapto-imidazoline.

5. An unvulcanized chloroprene polymer which can be rapidly cured at ordinary vulcanizing temperatures yet does not exhibit undesirable scorchy properties at ordinary temperatures, containing from 0.1% to 5.0% of the weight of the polymer of 2,4-diazabicyclo-[3.3.1]-3-nonanethione.

6. The process of vulcanizing chloroprene polymers which comprises incorporating in a chloroprene polymer stock from 0.05% to 10% of the weight of the polymer of the cyclic thiourea of the formula:

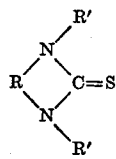

wherein R is a radical of the group consisting of aliphatic and cycloaliphatic radicals which contain from 2 to 24 carbon atoms and in which the thiourea ring contains from 3 to 5 carbon atoms, and the R' are substituents of the group consisting of —H and —CH$_3$, and heating at vulcanizing temperatures to effect curing of the polymer.

7. The process of vulcanizing chloroprene polymers which comprises incorporating in a chloroprene polymer stock from 0.1% to 5.0% of the weight of the polymer of the cyclic thiourea of the formula:

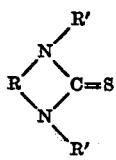

wherein R is a radical of the group consisting of aliphatic and cycloaliphatic radicals which contain from 2 to 24 carbon atoms and in which the thiourea ring contains from 3 to 5 carbon atoms, and the R' are substituents of the group consisting of —H and —CH$_3$, and heating at vulcanizing temperatures to effect curing of the polymer.

ARTHUR A. BAUM.

REFERENCES CITED

The following references are of record in the file of this patent:

UNITED STATES PATENTS

| Number | Name | Date |
| --- | --- | --- |
| 2,380,618 | Stewart | July 31, 1945 |